C. Starrett.
Revolving Rake.
No. 80,097.
Patented July 21, 1868.
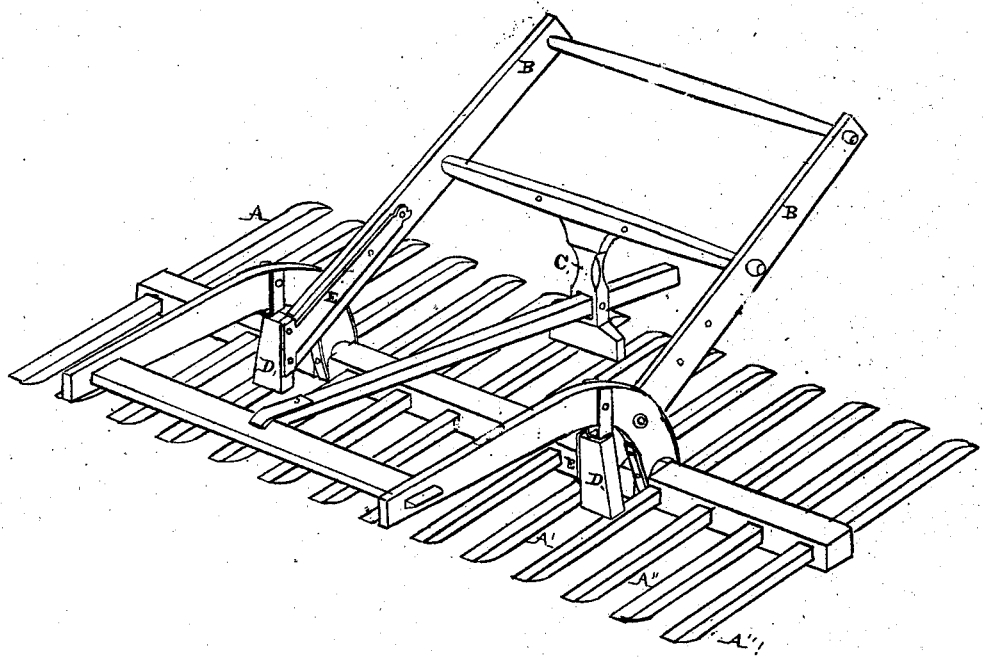
Witnesses
S. Morris Poe
Wm. H. Barnacle
Charles Starrett
by John J. Halsted
his Atty.

United States Patent Office.

CHARLES STARRETT, OF CHICAGO, ILLINOIS, ASSIGNOR TO HIMSELF AND EDWARD PRESCOTT, OF SAME PLACE.

Letters Patent No. 80,097, dated July 21, 1868.

IMPROVEMENT IN HORSE-RAKES.

The Schedule referred to in these Letters Patent and making part of the same.

TO ALL WHOM IT MAY CONCERN:

Be it known that I, CHARLES STARRETT, of the county of Cook, and in the State of Illinois, have invented a new and useful "Improvement in Horse Hay-Rakes;" and do hereby declare that the following is an exact, full, and clear description of the same, reference being had to the accompanying drawings, making part of this specification.

My invention relates to the class of revolving rakes, and is an improvement upon that patented November 25, 1862, to A. H. Chaplin, and numbered 36,992, and in which was employed, for the purpose of catching and sustaining the rake after a revolution had been completed, and to prevent a second revolution before any hay had been gathered, a piece of metal, bent into such quadrangular form that one of the longer sides inclined towards the other, the end of the metal being free, so that this inclined side, when pressed by a tooth of the revolving rake, was forced out of its normal position until the tooth had passed, when the resilience of the spring caused it to resume its place, and so form a lock or catch to prevent the teeth from turning back again.

There are serious objections to this device, and which my invention is designed effectually to remedy, the objections being that the action of these metal springs upon the same wooden teeth at each revolution of the rake is such as to rapidly scrape and cut them away at their points of contact, and so destroy them, and the spring so formed being an irregular open hoop, having its edges facing towards the hay which is collected upon the teeth, clogs the action of the rake by catching the hay and gathering it around itself.

Also, the action of the teeth upon the peculiar spring of Chaplin (which performs the double duty of spring and lock) tends, after much use, to change its form, so as to lessen the inclination of the inclined or cam side, and so to gradually destroy its efficiency.

The wear which takes place on those teeth which come in contact with the edges of this spring, besides ultimately cutting or chafing away the teeth, as above stated, and rendering them useless or requiring to be replaced, also makes them irregular on their surface, and full of nicks and cuts, and causes them to retain the hay, &c., improperly at times, when they should freely discharge it.

By my improvement, I also avoid any scraping or abrasion of metal against the wooden teeth, and present a flat, solid face against the accumulating hay, instead of two thin metallic edges, with a space between them, and one of these vibrating at every revolution of the teeth.

In the drawing is represented a horse-rake, of ordinary construction in the main, and also containing my improvements.

A A' A'' A''' designate the teeth upon the usual revolving shaft; B B, the handles, with the usual drop-bar, C, attached. D D are wooden blocks, broader at their base than at their tops, one side of each block, namely, that against which one of the revolving teeth must bear, having an inclination upwards towards its opposite side, the width of this block or wedge-piece being, however, less at its base than the space between the teeth. Each of these blocks is rigidly secured in a vertical position to the forward end of a flat spring, E, which, towards its rear end, is bolted or otherwise firmly fastened to the handles B B, respectively. The inclined face of the block, which during each revolution abrades or chafes against the tooth, is of wood only, so that no metal is in position to wear the teeth away, the spring being so applied and located as to accomplish all the object attained by Chaplin's or any other form of spring, but being entirely out of the way of possible contact with the teeth.

The operation is as follows:

The horse, being attached to the rake in the usual way, and the machine put in motion, as the rake commences to revolve, the narrow ends of the blocks D D permit the rake to pass over them, the blocks severally entering between two adjacent teeth, and that tooth which is in immediate proximity to the inclined side of the block bears against it with a pressure constantly increasing as the revolution of the rake continues, and thus presses outward from the handle B, and from its own normal position the spring E, until the tooth has passed beyond the base or broad part of the block, when the force of the spring causes it suddenly to fly back to its place, thus bringing the base of the block behind the tooth, and securing the rake firmly in its position.

I do not claim anything contained in the patent of Chaplin, above mentioned; but

I claim the springs E E, applied as shown, in combination with solid wooden blocks D D, having each a rigid inclined face, the whole constructed and arranged to operate as and for the purpose set forth.

CHARLES STARRETT.

Witnesses:
 HENRY E. BIGELOW,
 SAM'L MANDEVILLE.